(12) United States Patent
Xin

(10) Patent No.: US 10,525,481 B2
(45) Date of Patent: Jan. 7, 2020

(54) INTELLIGENT CLOSED TYPE DOMESTIC WASTE SORTING BUS

(71) Applicant: Tian Xu, Hangzhou (CN)

(72) Inventor: Zhaoliang Xin, Hangzhou (CN)

(73) Assignee: Tian Xu, Hangzhou (CN)

( * ) Notice: Subject to any disclaimer, the term of this patent is extended or adjusted under 35 U.S.C. 154(b) by 73 days.

(21) Appl. No.: 15/961,852

(22) Filed: Apr. 24, 2018

(65) Prior Publication Data

US 2019/0015842 A1  Jan. 17, 2019

(30) Foreign Application Priority Data

Jul. 14, 2017 (CN) .......................... 2017 1 0577398

(51) Int. Cl.
| | | |
|---|---|---|
| *B03B 9/06* | (2006.01) | |
| *B03B 7/00* | (2006.01) | |
| *B65F 3/00* | (2006.01) | |
| *B03B 5/28* | (2006.01) | |
| *B03B 5/48* | (2006.01) | |
| *B03B 11/00* | (2006.01) | |
| *B03B 5/36* | (2006.01) | |

(52) U.S. Cl.
CPC ................. *B03B 9/06* (2013.01); *B03B 5/28* (2013.01); *B03B 5/36* (2013.01); *B03B 5/48* (2013.01); *B03B 7/00* (2013.01); *B03B 11/00* (2013.01); *B65F 3/00* (2013.01); *B65F 3/001* (2013.01); *Y02W 30/622* (2015.05)

(58) Field of Classification Search
CPC .... B03B 9/06; B03B 5/28; B03B 5/36; B03B 5/48; B03B 7/00; B03B 11/00; B65F 3/00; B65F 3/001

USPC ........................................ 209/12.1, 420, 421
See application file for complete search history.

(56) References Cited

U.S. PATENT DOCUMENTS

| | | | | |
|---|---|---|---|---|
| 6,117,671 A | * | 9/2000 | Yilmaz | ...................... B03B 9/06 209/930 |
| 7,618,002 B2 | * | 11/2009 | Sato | ..................... B02C 19/0081 241/101.741 |
| 2004/0206675 A1 | * | 10/2004 | Okamoto | .................. B03B 9/06 209/421 |

FOREIGN PATENT DOCUMENTS

DE          10016686 A1  *  10/2001  ............... B03B 5/48

* cited by examiner

*Primary Examiner* — Terrell H Matthews
(74) *Attorney, Agent, or Firm* — Schwegman Lundberg & Woessner, P.A.

(57) ABSTRACT

The present invention relates to an intelligent closed type domestic waste sorting bus, including a bus body, a main collection device, a pickup device, a wind separation device, a water separation device, an arrangement device and a control system. The rotary shafts on the pickup device are all distributed with single-row pickup nails. The main collection device is provided with a sliding sleeve, and a distal end of the sliding sleeve is provided with a cutting-stripping machine. The wind separation device is provided with a blowing apparatus. The arrangement device includes a first collection mechanism, a second collection mechanism, a sediment collection mechanism, a floater arrangement mechanism and a main arrangement mechanism; the present invention can achieve primary sorting of municipal domestic waste in early days, which provides the possibility and convenience for the subsequent professional disposal, and will change the current disposal mode of municipal domestic waste.

18 Claims, 4 Drawing Sheets

INTELLIGENT CLOSED TYPE DOMESTIC WASTE SORTING BUS

CROSS-REFERENCE TO RELATED APPLICATIONS

This Non-provisional application claims priority under 35 U.S.C. § 119(a) on Patent Application No(s). 201710577398.9 filed in People's Republic of China on Jul. 14, 2017, the entire contents of which are hereby incorporated by reference.

BACKGROUND OF THE INVENTION

Field of the Invention

The present invention relates to a waste sorting mechanical equipment field, and more particularly, to an intelligent closed type domestic waste sorting bus.

Description of the Related Art

Currently, most of the domestic waste adopts direct landfill (including sanitary landfill) and incineration ways to be disposed. Both of these two ways produce pollution to the land, groundwater and air, leaving a plurality of troubles. Waste sorting, refers to a general term for a series of activities, which activities are classification storing, classification throwing and classification transporting according to a certain standard thus the waste being transformed into public resources. Membrane plastic in waste (such as plastic bags and plastic films) is one of the main recyclable pollution sources. At present, the object of the domestic waste sorting is to improve the resource value of waste, reduce pollution and protect the environment. However, currently, the domestic and foreign waste sorting equipment are all of large and complex structure, and it needs a very good classification throwing and pre-sorting as a precondition. Waste is mostly carried out a thoroughgoing disposal in the waste dump (or centralized locale), in this way, it needs to throw into a plurality of manpower and material resources and to work under a very poor working condition. This is very inhuman for the staff worked here. The drawbacks are obvious, and it does neither meet nor conducive to the development of the industrial disposal. Therefore, the research of a primary sorting device aimed at the main problems in waste sorting, convenient for the community site and use in early stage applicable to a plurality of situations, applicable to dispose new waste and landfill waste, will change the current bad mode of the waste disposal.

BRIEF SUMMARY OF THE INVENTION

To solve the above problem in the prior art, the objective of the present invention is to provide an intelligent closed type domestic waste sorting bus. The present invention has the advantages of simple structure, reasonable planning, convenient to use, strong adaptability and practicality. In the early days of the waste decay and beginning to stink, physical methods were adopted to carry out primary sorting on the waste, which did not cause new (subsequent) problems. After picking up the membrane material (such as plastic bags and plastic films, further including fabric and so on), the waste is primary sorted and disposed, and then put the waste into different storage box and the waste is compression packaged, such that to lay a foundation for further disposal. The present invention is a primary sorting facility for the highly integrated municipal domestic waste and provides feasible and reliable equipment support for the primary sorting of the municipal domestic waste. The present invention can not only be used for the disposal of the fresh waste, but also for the disposal of the landfilled waste, thereby changing the current bad operation mode of the waste disposal.

To achieve the above objective, the present invention adopts the following technical solution.

An intelligent closed type domestic waste sorting bus includes a bus body, a pickup device, a main collection device, a separation device, an arrangement device, and a control system.

The bus body, which is a hollow shell structure, is provided with a waste inlet and a waste sorting products outlet. The pickup device is located at one end of the bus body interior, and the pickup device includes a pickup mechanism and a pickup control mechanism. The pickup mechanism includes a first driver and a pickup wheel. The first driver is fixedly connected with the bus body, and the pickup wheel is nested to the first driver. The pickup control mechanism includes a waste control sliding plate and a second driver. The waste control sliding plate is electrically connected with the second driver, and the second driver is fixedly connected with the bus body. The waste control sliding plate is located below the pickup wheel.

The main collection device includes a sliding sleeve, a sliding assembly, a cutting-stripping mechanism and a transport mechanism. The cutting-stripping mechanism is installed at one end of the sliding sleeve far away from the pickup wheel, the sliding assembly cooperates with the sliding sleeve, and the sliding assembly can relatively move with the sliding sleeve. The cutting-stripping mechanism is used for stripping the waste on the pickup wheel, and the transport mechanism is located below the cutting-stripping mechanism for transporting the stripped waste to the next procedure.

The separation device includes a wind separation mechanism and a water separation mechanism. The wind separation mechanism includes a blowing mechanism, a first sorting assembly and a first collection mechanism. The first sorting assembly is fixedly connected with the bus body, and the first sorting assembly is located below the pickup wheel and followed with a procedure of the pickup mechanism. The first sorting assembly is provided with a leakage port for waste falling, and the leakage port is provided with a waste raking-transporting mechanism. The waste is controlled to fall off from the leakage port, and the blowing mechanism blows just below the leakage port. The water separation mechanism includes a feeding water container, a falling board and a second collection mechanism. The feeding water container communicates with the second collection mechanism, the falling board is fixedly connected with the bus body, the falling board is located at one side of the leakage port, and the second collecting mechanism is used for collecting the light waste fallen from the falling board.

The arrangement device includes a main arrangement mechanism and an auxiliary arrangement mechanism. The main arrangement mechanism is connected with the transport mechanism and used for collecting and packaging the waste obtained from the main collection device. The auxiliary arrangement mechanism is used for collecting and packaging the waste obtained from the second collection mechanism. The control system is used for controlling the pickup device, the main collection device, the separation device and the arrangement device.

In an embodiment of the present invention, the auxiliary arrangement mechanism may include a floater arrangement mechanism and a sediment arrangement mechanism. The floater arrangement mechanism may be used for collecting and packaging a floater separated from the second collection mechanism, and the sediment arrangement mechanism may be used for collecting sediment separated from the second collection mechanism. The bus body is provided with the waste sorting products outlet, and the waste products after collecting and packaging may be outputted from the waste sorting products outlet.

In an embodiment of the present invention, the second collection mechanism may include a water storage tank, a first collection container and a second collection container. The water storage tank may communicate with the feeding water container, the first collection container may be located in the water storage tank and may communicate with the water storage tank. The second collection container may be nested in the first collection container A floater catching-fishing net may be disposed in the first collection container, and the floater catching-fishing net may be movably connected with the bus body. The floater catching-fishing net may cooperate with the floater arrangement mechanism, and the second collection container may cooperate with the sediment arrangement mechanism.

In an embodiment of the present invention, bottoms of the main collection device, the main arrangement mechanism and the floater arrangement mechanism may be all provided with water traps, and the water traps may communicate with the first collection mechanism. Specifically, the water traps communicates with the first collection container.

In an embodiment of the present invention, the first collection mechanism may include a first collection funnel and a first box-frame. The first collection funnel may be located above the first box-frame and be movably connected with the first box-frame. The sediment arrangement mechanism may include a sediment collection funnel and a sediment box-frame. The sediment collection funnel may be located above the sediment box-frame and be movably connected with the sediment box-frame. Rotary mechanisms are provided on both the first collection funnel and the sediment collection funnel. The rotary mechanism includes a pneumatic press, and the pneumatic press is connected with a pneumatic rod. The floater arrangement mechanism may be a packaging and wrap-frame device, which is used for packaging and storing the floater; and the main arrangement mechanism may also be a packaging and wrap-frame device, which is used for packaging and storing membrane waste such as plastic film picked up.

In an embodiment of the present invention, the sliding assembly may include a sliding motor, a pulley assembly and a rack. The pulley assembly may be rotatably connected with the pickup wheel, the rotary shaft is fitted to the first motor, the sliding motor may be fixedly connected with the pulley assembly, the rack may be fixedly disposed at an inner wall of the sliding sleeve, and the pulley assembly may be drive connected with the rack.

In an embodiment of the present invention, the pulley assembly may include a pulley, a gear and a coupling shaft. The pulley and the gear may be fixedly installed at two ends of the coupling shaft respectively. A bearing may be disposed between the coupling shaft and the rotary shaft. The rail is disposed on an inner wall of the sliding sleeve. The rack may be located at an inner wall of the sliding sleeve, the gear may be engaged with the rack, and the pulley may be slidably connected with the sliding rail. A rail support base is disposed below the sliding sleeve, and the rail support base is fixedly connected with the bus body.

In an embodiment of the present invention, the main collection device may further includes a funnel-shaped falling board and a rake hand, the funnel-shaped falling board and the rake hand may be disposed in the waste inlet, and the waste inlet may be located at an upper position of a rear end of the bus body. A falling port may be disposed on the falling board, and the rake hand may be used for raking the waste from the falling board to the falling port. The falling port is distributed along above the pickup wheel.

In an embodiment of the present invention, the pickup wheel may include a rotary shaft and a pickup nail. The first driver may include a first motor. There may be a plurality of rotary shafts. The rotary shaft may be rotatably connected with the first motor. There may be a plurality of pickup nails all fixed on the rotary shafts. The rotary shaft may be provided with a pressure sensor electrically connected with the control system; and the rotary shafts may be distributed in a plurality of layers, and each of the layers may have a plurality of rotary shafts. The waste control sliding plate may be disposed under the rotary shaft, and the waste control sliding plate may be used for controlling the falling and staying of the waste.

In an embodiment of the present invention, the second driver may include a micro motor and an eccentric wheel. The micro motor may be located at both sides of the waste control sliding plate and be fixedly connected with the bus body. A central shaft of the eccentric wheel may be connected with the micro motor through a belt, and the waste control sliding plate may be movably connected with the eccentric wheel. The eccentric wheel is used for controlling the movement of the waste control sliding plate.

In an embodiment of the present invention, the first sorting assembly may include an upper dome and a downward inclined board. The upper dome and the downward inclined board may form the trumpet-shaped leakage port. The blowing mechanism may be located below the downward inclined board, and a plurality of water spray nozzles may be fixedly installed in the upper dome.

In an embodiment of the present invention, the blowing mechanism may include a blower. An air outlet of the blower may be flat and upwardly inclined, and the air outlet may be arranged in parallel up and down.

In an embodiment of the present invention, the falling board gradually upturned in a direction away from the second collection mechanism, and a return air baffle may be disposed at an end above the falling board closed to an upturning.

In an embodiment of the present invention, the falling board may be provided with a first gap and a second gap. A lower position of the first gap may be provided with the sediment arrangement mechanism, and a lower position of the second gap may be provided with the floater arrangement mechanism. Both the first gap and the second gap may be both provided with waterproof retractable cover plates.

In an embodiment of the present invention, a bottom of the bus body may be provided with a plurality of wheels and a plurality of support legs. A front position of the bus body may be provided with an air outlet, a filter device may be provided in the air outlet, and the air outlet is adjacent to a top of the falling board.

In an embodiment of the present invention, a plurality of flushing nozzles may be disposed in the main collection device; and the transport mechanism may be a conveyor belt located below the cutting-stripping mechanism;

In an embodiment of the present invention, two sides and the space between the main collection device and the pickup device may be provided with a support box, respectively, and a limit switch may be disposed in the support box.

In an embodiment of the present invention, the bus body is further provided with a cable connection jack, a global positioning system, a wireless information transceiver device, an odor reduction device and/or a laminar flow device, a self-cleaning device and a maintenance device.

The present invention has the following beneficial effects:

The present invention is highly integrated, easy to use and has strong adaptability. By the pickup, unloading and compression packaging disposal of the membrane waste in the domestic waste, especially plastic bags and plastic films, as well as waste sorting for other types of waste, the waste after collecting and sorting is transported through the waste sorting products outlet, respectively. The present invention provides convenient and reliable equipment support for the primary sorting of the domestic waste, and the present invention can not only be used in the fresh waste disposal, but also applicable for the landfill waste.

Figure 1:
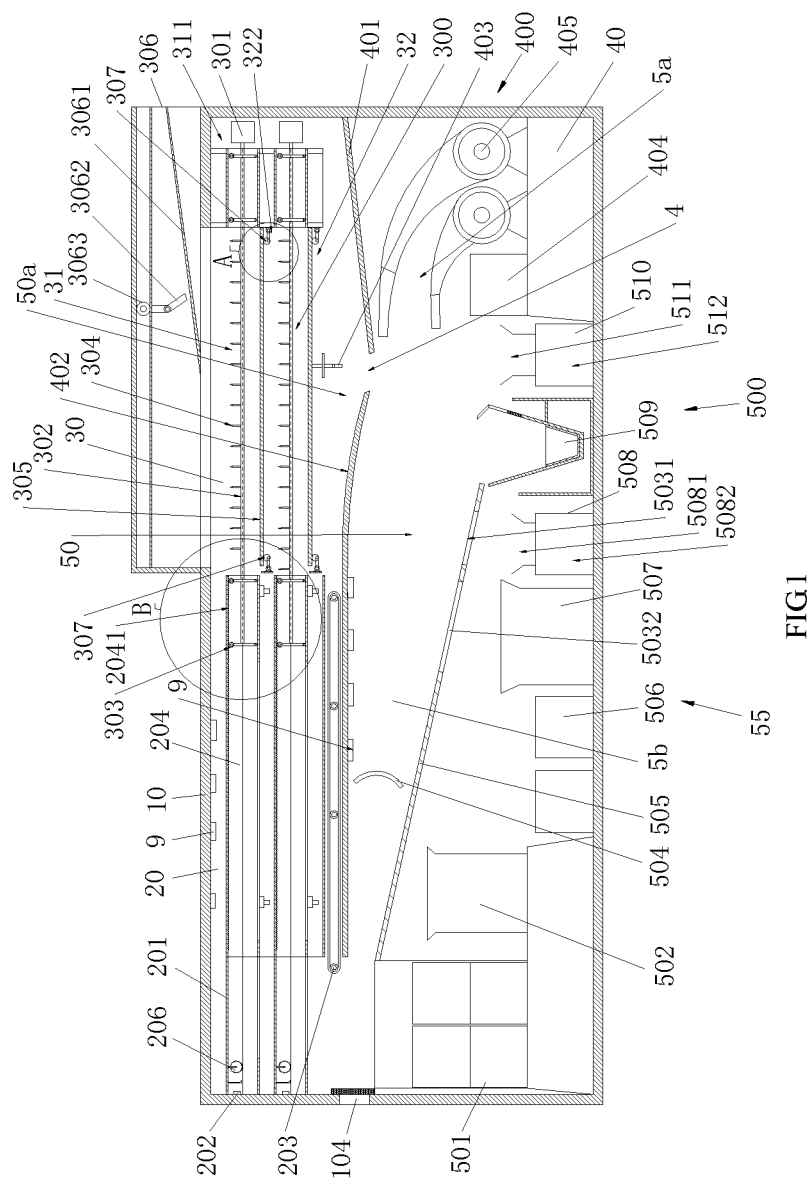
FIG. 1 is a schematic diagram of an internal structure of a bus body in an embodiment of the present invention.

Elements in the drawings are marked as below:

10. bus body; 101. wheel; 102. support leg; 103. car head central control room; 1333. control system; 104. air outlet; 20. main collection device; 201. support box; 202. limit switch; 203. transport mechanism; 204. sliding sleeve; 2041. rack; 205. support base; 206. cutting-stripping machine; 30. pickup device; 301. a first motor; 302. rotary shaft; 123. pulley assembly; 11. pulley; 22. coupling shaft; 333. sliding motor; 303. gear; 222. sliding rail; 304. pickup nail; 305. waste control sliding plate; 306. waste inlet; 309. pressure sensor; 600. waste sorting products outlet; 3061. falling board; 3062. rake hand; 3063. mobile motor; 307. eccentric wheel; 308. micro motor; 401. downward inclined board; 402. upper dome; 4. leakage port; 403. arrangement rake; 404. feeding water container; 405. blower; 50. separation device; 502. main arrangement mechanism; 500. auxiliary arrangement mechanism; 501. membrane waste wrap-frame; 510. first collection mechanism; 511. first collection funnel; 512. first box-frame; 508. sediment arrangement mechanism; 5081. sediment collection funnel; 5082. sediment box-frame; 506. floater wrap-frame; 507. floater arrangement mechanism; 5031. first gap; 5032. second gap; 504. return air baffle; 505. falling board; 509. second collection mechanism; 5091. drainage hole; 5092. water storage tank; 5093. filter screen; 5094. wave-proof board; 5095. first collection container; 5190. second collection container; 5096. floater catching-fishing net; 5097. first rail; 5098. second rail; 5099. third rail; 5191. horizontal filter screen; 31. pickup mechanism; 32. pickup control mechanism; 311. first driver; 300. pickup wheel; 200. sliding assembly; 322. second driver; 305. waste control sliding plate; 5a. wind separation mechanism; 5b. water separation mechanism; 400. blowing mechanism; 50a. first sorting assembly; 55. arrangement device; 100. control system.

DETAILED DESCRIPTION OF THE INVENTION

The following is only a preferred embodiment of the present invention and is not to limit the scope of the invention.

Figure 2:
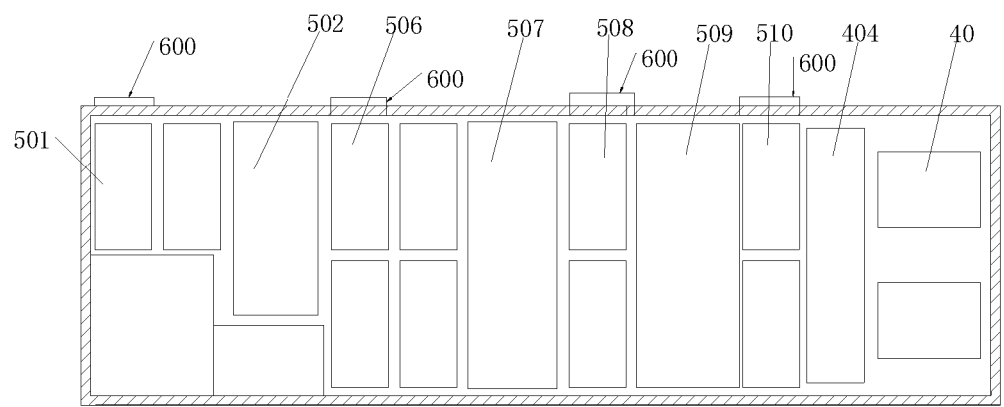
FIG. 2 is a top view of an internal bottom of FIG. 1.
Figure 3:
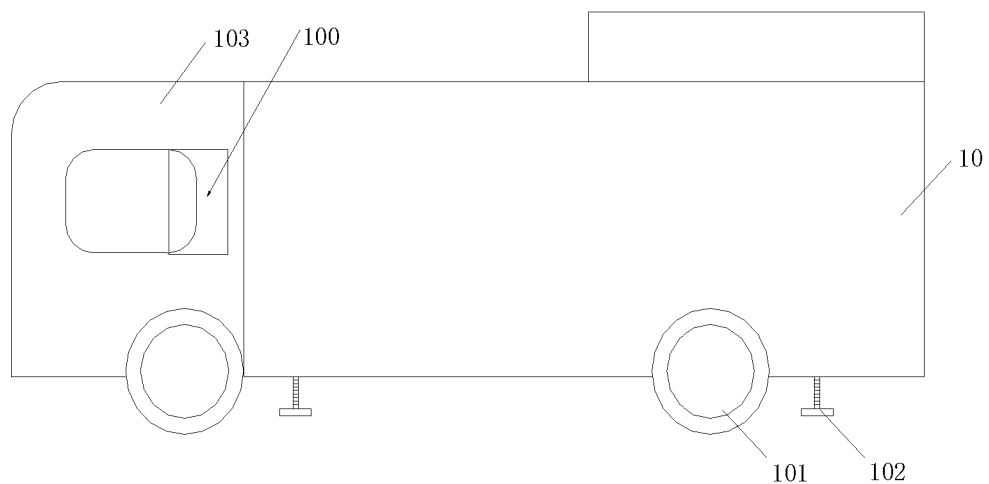
FIG. 3 is a schematic diagram of an external structure of FIG. 1.
Figure 4:
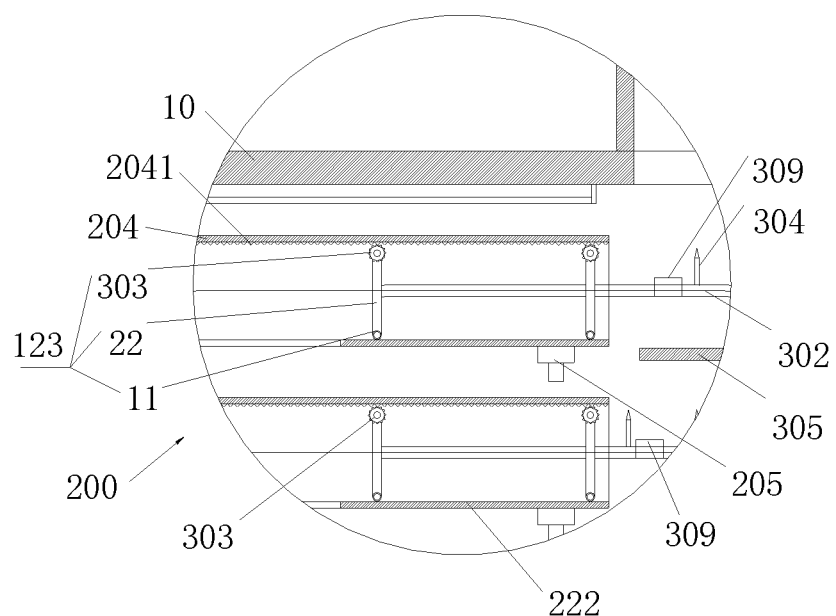
FIG. 4 is a schematic diagram of an enlarged structure of A region in FIG. 1.
Figure 5:
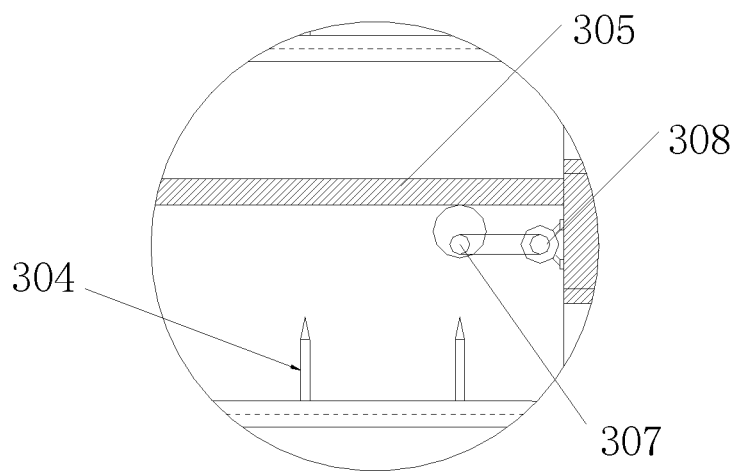
FIG. 5 is a schematic diagram of an enlarged structure of B region in FIG. 1.
Figure 6:
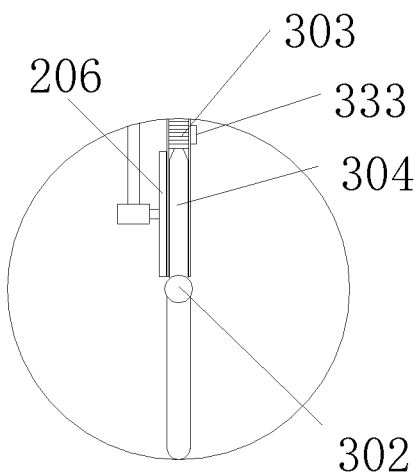
FIG. 6 is a schematic diagram of a cross-sectional view of a sliding sleeve in an embodiment of the present invention.
Figure 7:
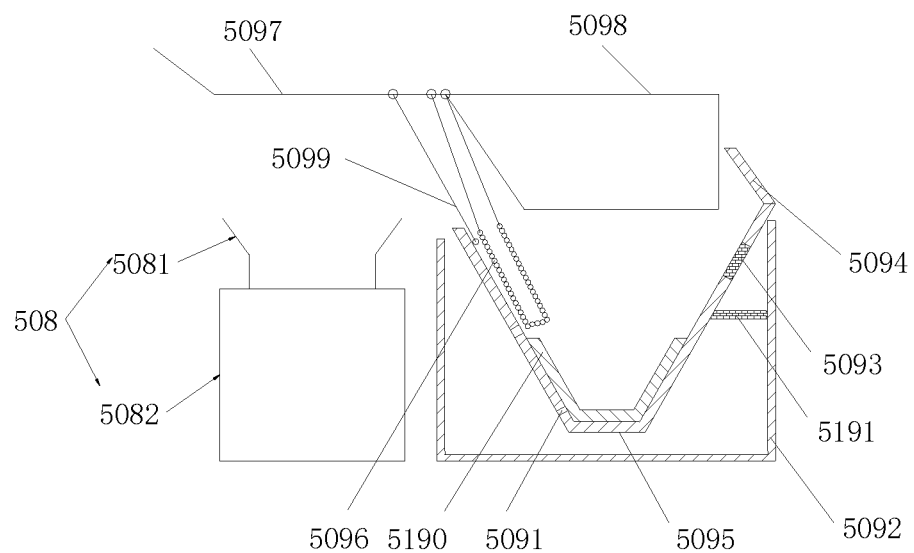
FIG. 7 is a structure schematic diagram of a second collection mechanism in an embodiment of the present invention.

An intelligent closed type domestic waste sorting bus, as shown in FIG. 1-7, includes a bus body 10, a main collection device 20, a pickup device 30, a wind water separation device 50, an arrangement device and a control system 100. The main collection device 20, the pickup device 30, the wind water separation device 50 and the arrangement device are all distributed in the bus body 10.

A waste inlet 306 and a waste sorting products outlet 600 are disposed on the bus body 10, and the waste inlet 306 is located at an upper position of a rear end of the bus body 10. The waste sorting products outlet 600 corresponds to the arrangement device and is used for outputting the waste package and box after sorting. The waste inlet 306 is provided with a funnel-shaped falling board 3061 and a rake hand 3062. The falling board 3061 is provided with a falling port, and the rake hand 3062 is used for raking the waste from the falling board 3061 to the falling port. The falling port is distributed along the pickup wheel, and the rake hand 3062 is driven by the mobile motor 3603.

The pickup device 30 includes a pickup mechanism 31 and a pickup control mechanism 32. The pickup mechanism 32 includes a first driver and a pickup wheel 300. The first driver 311 includes a first motor 301, and the first motor 301 is fixedly connected with the bus body 10. The pickup wheel 300 includes a rotary shaft 302 and a pickup nail 304. The rotary shaft 302 is rotatably connected with the first motor 301. There are some pickup nails 304 and they are all fixed on the rotary shaft 302. The rotary shaft 302 is provided with a pressure sensor 309, and the pressure sensor 309 is electrically connected with the control system 1333 for detecting the waste weight on the rotary shaft 302. The rotary shaft 302 has several layers, which are arranged in a horizontal direction and arranged in a vertical direction.

The pickup control mechanism 31 includes a waste control sliding plate 305 and a second driver 322. The second driver 322 includes a micro motor 308. The waste control sliding plate 305 is connected with the eccentric wheel 307 through the micro motor 308, that is, the central shaft of the eccentric wheel 307 is connected with the micro motor 308 through a belt. The micro motor 308 is located at the bottom of two sides of the waste control sliding plate 305. The micro motor 308 is fixedly connected with the bus body 10. The waste control sliding plate 305 is disposed below each row of the rotary shafts 302, and the waste control sliding plate 305 is used for controlling the falling and staying of the waste.

Two ends of the rotary shaft 302 are provided with two groups of pulley assemblies 123, respectively. The pulley assembly 123 includes a pulley 11, a gear 303 and a coupling shaft 22. The pulley 11 and the gear 303 are fixedly installed at two ends of the coupling shaft 22 respectively. A bearing is disposed between the coupling shaft 22 and the rotary shaft 302.

The main collection device 20 includes a sliding sleeve 204, and the sliding sleeve 204 is provided with a sliding rail 222. The pulley 11 is slidably connected with the sliding rail 222. A rack 2041 is disposed at an inner wall of the sliding sleeve 204, and the rack 2041 is engaged with a gear 303. The upper half part of each pulley 11 is provided with a sliding motor 333, and the gear 303 is disposed on the main shaft of the sliding motor 333.

The bottom of the sliding sleeve 204 is provided with a guide rail support base 205, and one end of the sliding sleeve 204 near the head of the bus is provided with a cutting-stripping machine 206. The cutting-stripping machine 206 includes one group of electric cutting saw and a cutting-stripping blade. Some nozzles 9 are disposed in the main collection box 20. Two sides and the space between the main collection device 20 and the pickup device 30 are provided with a support box 201, respectively, and a limit switch 202 is disposed in the support box 201.

The separation device 50 includes a wind separation mechanism 5*a* and a water separation mechanism 5*b*. The wind separation mechanism 5*a* includes a first sorting assembly 50*a*, a blowing mechanism 400 and a first collection mechanism 510. The first sorting assembly 50*a* includes part of a upper dome 402 and a downward inclined board 401. The upper dome 402 and the downward inclined board 401 are both fixedly connected with the bus body 10. The upper dome 402 and the downward inclined board 401 form the trumpet-shaped leakage port 4, and a waste raking-transporting mechanism is located above the upper dome 402 and the downward inclined board 401. In the present embodiment, the waste raking-transporting mechanism is an arrangement rake 403. The arrangement rake 403 is used for raking the waste fallen from the waste control sliding plate 305 to the leakage port 4. The leakage port 4 is provided with a retractable cover plate, and a removable arrangement rake 403 is disposed above the leakage port 4. A plurality of nozzles 9 are fixedly installed in the upper dome 402. The air outlet of the blower 405 is flat and upwardly inclined, that is, the air outlet of the blower 405 is towards the direction of the falling board 505. The air outlet is arranged in parallel up and down, that is, the blower 405 blows below the leakage port 4.

The water separation mechanism 5*b* includes a feeding water container 404, a falling board 505 and a second collection mechanism 509. The feeding water container 404 communicates with the second collection mechanism 509 and is provided with a clean water interface. The falling board 505 is fixedly connected with the bus body 10. The falling board 505 is inclined and located at one side of the leakage port 4, and the second collecting mechanism 509 is used for collecting light waste fallen from the falling board 505.

The first collection mechanism 510 includes a first collection funnel 511 and a first box-frame 512, and the first collection funnel 511 is located above the first box-frame 512. The first collection funnel 511 is located just below the leakage port 4 and is used for collecting the relatively heavy solid waste fallen from the leakage port 4. However, the relatively light waste fallen from the leakage port 4 is blown to the falling board 505 by the blower 405, and further drops onto the falling board 505.

The second collection mechanism 509 is located at an end of one end of the falling board 505 downward. The second collection mechanism 509 includes a water storage tank 5092, a first collection container 5095 and a second collection container 5190. The first collection container 5095 and the second collection container 5190 are V-type structure.

The upper position of the back side board 5095*a* of the first collection container 5095 is provided with a wave-proof board 5094, a water level receptor, a feeding water container outlet and a filter screen 5093. A foldable stirring rod is disposed below the wave-proof board 5094, and a horizontal filter screen 5191 is disposed between the outside of the filter screen 5093 and the water storage tank 5092. The water storage tank 5092 communicates with the feeding water container 404 through a pump. The upper position of the front side board 5095*b* of the first collection container 5095 is attached with a floater catching-fishing net 5096. The upper edge of the floater catching-fishing net 5096 is fixed on two long rods arranged front and back side by side, and both sides of the long rod are connected with a first power rod. The first power rod is driven by a motor moved along a first rail 5097 and a second rail 5098. The bottom of the first collection container 5095 is provided with drainage holes 5091. A small roller that slides along the wall of the first collection container 5095 is installed on the second collection container 5190. Two sides of the second collection container 5190 are connected with a second power rod, and the second power rod is driven by the motor that moves along the third rail 5099 of the bus body. The second collecting container 5190 is provided with overflow holes around the upper part thereof, and a sediment position sensor is further disposed on the second collecting container 5190.

The bottom of the conveyor belt 203, the floater packaging device 507 and the main packaging device 502 are all provided with water traps, and the water traps communicate with the first collection container 5095.

A sediment arrangement mechanism 508, a floater arrangement mechanism 507, a floater wrap-frame 506, a main arrangement mechanism 502 and a membrane waste wrap-frame 501 are disposed below the falling board 505. The main arrangement mechanism 502 is a packaging device and is used for compression packaging the membrane waste picked up, such as plastic bags, films and fabric waste. The compression parcel after packaging is placed in the membrane waste wrap-frame 501 located next to it. A return air baffle 504 is disposed above the falling board 505 close to an upturned end.

The falling board 505 is further provided with a first gap 5031 and a second gap 5032. A lower position of the first gap corresponds to the sediment arrangement mechanism 508. The sediment arrangement mechanism 508 includes a sediment collection funnel 5081 and a sediment box-frame 5082, and the sediment collection funnel 5081 is located above the sediment box-frame 5082. The sediment collection funnel 5081 is rotatable, and the waste is collected from the sediment collection funnel 5081 to the box placed on sediment box-frame 5082. The lower position of the second gap 5032 corresponds to the floater arrangement mechanism 507. The floater arrangement mechanism 507 is a packaging device and is used for packaging the floater; and the compression parcel after packaging is placed in the floater wrap-frame 506 located next to it.

The first collection funnel 511 and the sediment collection funnel 5081 are both provided with rotary mechanisms. The rotary mechanism includes a pneumatic press, and the pneumatic press is connected with a pneumatic rod.

During working, when the sliding motor 333 is started, the sliding sleeve 204 and the rotary shaft 302 in the main collection device 20 and the pickup device 30 can be moved with respect to each other at this time, the plastic waste bags and films on the rotary shaft 302 are subjected to the cutting-stripping machine 206. The plastic waste bags and films are cut and fallen onto the transport mechanism 203, and then conveyed to the main arrangement mechanism 502 for packing. In the present embodiment, the transport mechanism 203 is a conveyor belt. The waste that has not been hooked by the pickup nail 304 falls directly to the bottom of the pickup device 30 through the waste control sliding plate 305, and then is raked by the cleaning rake 403 to the leaking port 4 and fallen into the wind water separation device 50. Under the blowing of the blower 405, solid waste with a certain weight falls directly into the first arrangement mechanism 510, and the light waste is blown onto the first collection container 5095 and the falling board 505, and finally the light waste falls into the first collection container 5095. The floated waste is finally salvaged into the floater packaging device 507 to be packaged; and the precipitated waste is finally salvaged into the box placed on sediment box-frame 5082 to complete the sorting collection.

The foreside of the bus body 10 is provided with a filter device 104, and the filter device is an odor reduction or laminar flow device such as a filter screen and an activated carbon. The bottom of the bus body 10 is provided with wheels 101 and support legs 102. The central control room 103 disposed at the head of the bus body 10, and a control system 100 is provided with the central control room 103. The control system 100 is used for controlling the monitoring probes, sensors, pumps, pneumatic rods, water spray nozzles, flushing nozzles, limit switches and each motor, which are disposed in the interior of the bus body 10. The central control room 103 is further provided with a global positioning system and a wireless information transceiver device.

What is claimed is:

1. An intelligent closed type domestic waste sorting bus, comprising:
    a bus body (10), being a hollow shell structure, wherein the bus body is provided with a waste inlet (306) and a waste sorting products outlet (600);
    a pickup device (30), being located at one end of the bus body interior, wherein the pickup device (30) comprises a pickup mechanism (31) and a pickup control mechanism (32), the pickup mechanism (31) comprises a first driver (311) and a pickup wheel (300), the first driver (311) is fixedly connected with the bus body (10), and the pickup wheel (300) is connected with the first driver (311), the pickup control mechanism (31) comprises a waste control sliding plate (305) and a second driver (322), the waste control sliding plate (305) is connected with the second driver (322), the second driver (322) is fixedly connected with the bus body (10), and the waste control sliding plate (305) is located below the pickup wheel (300);
    a main collection device (20), comprising a sliding sleeve (204), a sliding assembly (200), a cutting-stripping mechanism (207) and a transport mechanism (203), wherein the cutting-stripping mechanism (207) is installed at one end of the sliding sleeve (204) far away from the pickup wheel (300), the sliding assembly (200) cooperates with the sliding sleeve (204), the sliding assembly (204) is used for moving the pickup wheel (300) towards to the cutting-stripping mechanism (207), the cutting-stripping mechanism (207) is used for stripping a waste on the pickup wheel (300), and the transport mechanism (203), is located below the cutting-stripping mechanism (207) for transporting the stripped waste to the next procedure;
    a separation device (50), comprising a wind separation mechanism (5a) and a water separation mechanism (5b), wherein the wind separation mechanism (5a) comprises a blowing mechanism (400), a first sorting assembly (50a) and a first collection mechanism (510), the first sorting assembly (50a) being fixedly connected with the bus body (10), the first sorting assembly (50a) being located below the pickup wheel (300) and being followed with a procedure of the pickup mechanism (31), the first sorting assembly (50a) being provided with a leakage port (4) for waste falling; and the water separation mechanism (5b) comprises a feeding water container (404), a falling board (505) and a second collection mechanism (509), the feeding water container (404) communicating with the second collection mechanism (509), the falling board (505) being fixedly connected with the bus body (10), and the second collecting mechanism (509) being used for collecting light waste dropping from the falling board (505);
    an arrangement device (55), comprising a main arrangement mechanism (502) and an auxiliary arrangement mechanism (500), the main arrangement mechanism (502) being connected with the transport mechanism (203) and used for collecting and packaging the waste obtained from the main collection device (20), and the auxiliary arrangement mechanism (500) being used for collecting and packaging the waste separated from the second collection mechanism (509); and
    a control system (100), being used for controlling the pickup device (30), the main collection device (20), the separation device (50) and the arrangement device (55).

2. The intelligent closed type domestic waste sorting bus according to claim 1, wherein the auxiliary arrangement mechanism (500) comprises a floater arrangement mechanism (507) and a sediment arrangement mechanism (508), the floater arrangement mechanism is used for collecting and packaging a floater separated from the second collection mechanism, the sediment arrangement mechanism is used for collecting a sediment separated from the second collection mechanism, the bus body is provided with a waste sorting products outlet (600), and the waste after collecting and packaging is outputted from the waste sorting products outlet (600).

3. The intelligent closed type domestic waste sorting bus according to claim 2, wherein the second collection mechanism (509) comprises a water storage tank (5092), a first collection container (5095) and a second collection container (5190), the water storage tank (5092) communicates with the feeding water container, the first collection container (5095) is located in the water storage tank (5092) and communicates with the water storage tank, the second collection container is nested in the first collection container, a floater catching-fishing net (5096) is disposed in the first collection container (5095), the floater catching-fishing net (5096) is movably connected with the bus body, the floater catching-fishing net (5096) cooperates with the floater arrangement mechanism (507), and the second collection container cooperates with the sediment arrangement mechanism (508).

4. The intelligent closed type domestic waste sorting bus according to claim 1, wherein the first collection mechanism (510) comprises a first collection funnel and a first box-frame, the first collection funnel is located above the first box-frame and is movably connected with the first box-frame; wherein the sediment arrangement mechanism (508) comprises a sediment collection funnel and a sediment box-frame, the sediment collection funnel is located above the sediment box-frame and is movably connected with the sediment box-frame; wherein the floater arrangement mechanism (507) is used for packaging a floater, and the main arrangement mechanism (502) is also used for packaging membrane waste.

5. The intelligent closed type domestic waste sorting bus according to claim 1, wherein the main collection device (20) further comprises a sliding sleeve (204), the cutting-stripping mechanism being installed at a end of the sliding sleeve far away from the pickup wheel, the sliding assembly cooperating with the sliding sleeve, and the sliding assembly being relatively moved with the sliding sleeve.

6. The intelligent closed type domestic waste sorting bus according to claim 1, wherein the sliding assembly comprises a sliding motor, a pulley assembly and a rack (2041), the sliding motor is fixedly connected with the pulley assembly, the pulley assembly is rotatably connected with the pickup wheel, the rack is fixedly disposed at an inner wall of the sliding sleeve, and the pulley assembly is drive connected with the rack.

7. The intelligent closed type domestic waste sorting bus according to claim 6, wherein the pulley assembly comprises a pulley, a gear (303) and a coupling shaft, the pulley and the gear are respectively installed at two ends of the coupling shaft, the coupling shaft is rotatably connected with the pickup wheel, the gear is engaged with the rack.

8. The intelligent closed type domestic waste sorting bus according to claim 1, wherein the main collection device (20) further comprises a funnel-shaped falling board (3061) and a rake hand (3062), the funnel-shaped falling board (3061) and the rake hand (3062) are disposed in the waste inlet, and the waste inlet (306) is located at an upper position of a rear end of the bus body.

9. The intelligent closed type domestic waste sorting bus according to claim 1, wherein the pickup wheel comprises a rotary shaft (302) and a pickup nail (304), and the first driver comprises a first motor (301), wherein the rotary shaft (302) rotatably connected with the first motor (301), the rotary shaft (302) is fitted to the first motor (301), there are some pickup nails (304) all fixed on the rotary shaft, the rotary shaft (302) is provided with a pressure sensor electrically connected with the control system, and the rotary shafts are distributed in a plurality of layers, and each of the layers has a plurality of rotary shafts, the waste control sliding plate being disposed below the rotary shaft for controlling a falling and a staying of the waste.

10. The intelligent closed type domestic waste sorting bus according to claim 1, wherein the second driver comprises a micro motor (308) and an eccentric wheel (307), the micro motor (308) is located at both sides of the waste control sliding plate (305) and is fixedly connected with the bus body, a central shaft of the eccentric wheel (307) is connected with the micro motor (308) through a belt, and the waste control sliding plate is movably connected with the eccentric wheel.

11. The intelligent closed type domestic waste sorting bus according to claim 1, wherein the first sorting assembly (50*a*) comprises an upper dome (402) and a downward inclined board (401), the upper dome (402) and the downward inclined board (401) form the trumpet-shaped leakage port, the blowing mechanism is located below the downward inclined board (401), and a plurality of water spray nozzles are fixedly installed in the upper dome (402).

12. The intelligent closed type domestic waste sorting bus according to claim 1, wherein the blowing mechanism comprises a blower (405), an air outlet of the blower (405) is flat and upwardly inclined.

13. The intelligent closed type domestic waste sorting bus according to claim 1, wherein the falling board (505) gradually upturned in a direction away from the second collection mechanism, and a return air baffle (504) is disposed above the upturning end of the falling board (505).

14. The intelligent closed type domestic waste sorting bus according to claim 13, wherein the falling board (505) is provided with a first gap (5031) and a second gap (5032), a lower position of the first gap is provided with the sediment arrangement mechanism (508), and a lower position of the second gap is provided with the floater arrangement mechanism (507).

15. The intelligent closed type domestic waste sorting bus according to claim 1, wherein a bottom of the bus body (10) is provided with a plurality of wheels (101) and a plurality of support legs (102), a front position of the bus body (10) is provided with an air outlet (104), a filter device is disposed in the air outlet (104), and the air outlet (104) is adjacent to a top of the falling board (505).

16. The intelligent closed type domestic waste sorting bus according to claim 1, wherein a plurality of flushing nozzles (9) are disposed in the main collection device (20); and the transport mechanism being a conveyor belt (203) located below the cutting-stripping mechanism (207).

17. The intelligent closed type domestic waste sorting bus according to claim 1, wherein the main collection device (20) further comprises some support box (201), two sides and the space between the main collection device (20) and the pickup device are all have a support box (201), respectively, and a limit switch (202) is disposed in the support box (201).

18. The intelligent closed type domestic waste sorting bus according to claim 1, wherein the bus body is further provided with a cable connection jack, a global positioning system, a wireless information transceiver device, an odor reduction device and/or a laminar flow device, a self-cleaning device and a maintenance device.

* * * * *